Nov. 27, 1945. T. R. SMITH 2,389,825
FIRE HOSE COUPLING
Filed Jan. 11, 1943
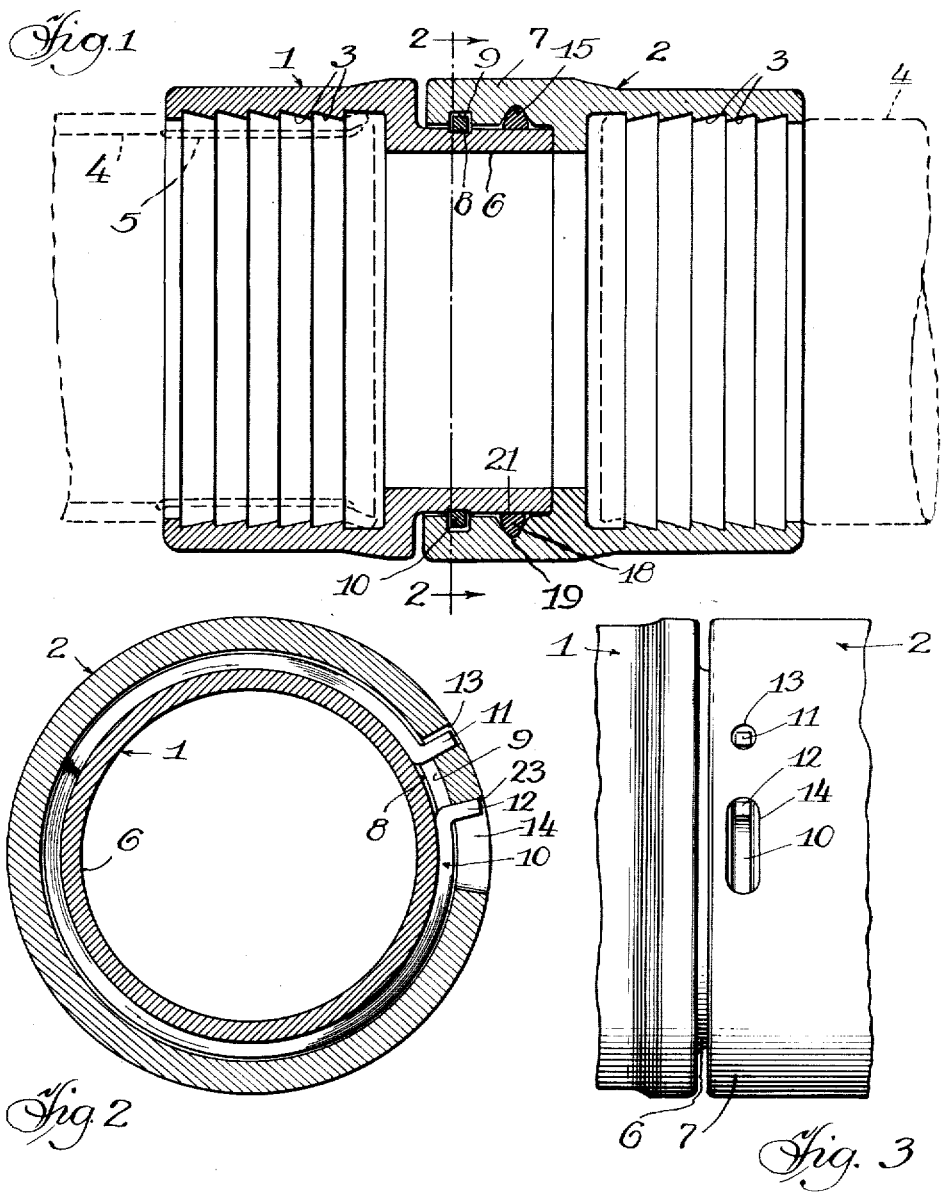
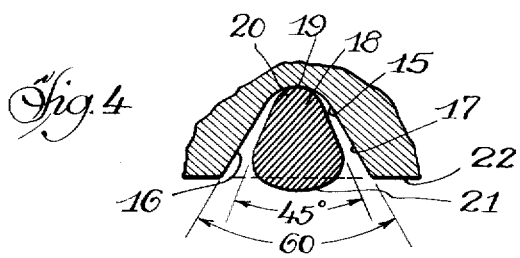
INVENTOR.
Thomas R Smith
BY
Parkinson + Lane
Attys.

Patented Nov. 27, 1945

2,389,825

UNITED STATES PATENT OFFICE 2,389,825

FIRE HOSE COUPLING

Thomas R. Smith, Newton, Iowa, assignor to The Maytag Company, Newton, Iowa, a corporation of Delaware Application January 11, 1943, Serial No. 471,959

2 Claims. (Cl. 285—97.8)

The present invention relates to a fire hose coupling and especially to a novel coupling unit that may be quickly and easily assembled and disassembled, and when assembled, is automatically sealed against leakage. In the present novel assembly, the invention comprehends a coupling having a male and female member to each of which is connected a length or section of hose by any suitable means such as by expanding a ferrule on the inner diameter of the hose to thereby anchor the hose against ridges or serrations provided on the interior surfaces of the coupling members. The male and female parts are locked together by means of a snap ring and sealing is effected by a substantially wedge-shaped sealing ring or packing mounted in one of the parts and having sealing contact with the other part. This novel assembly permits the parts to be swiveled, thus permitting more facile handling of the hose.

The invention further comprehends a novel means for disassemblying the parts of the coupling to disconnect the hose sections. To permit this disassembly, the free ends of the snap ring are each provided with an outwardly projecting portion, one of which extends into and locks within a relatively small opening and the other into an elongated slot both provided in the female part. In order to expand the snap ring, it is only necessary to insert an instrument into the slot to engage the projection therein and expand the ring, after which the coupling may be readily pulled apart.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in vertical cross section through the novel coupling construction and showing in dotted outline the hose sections to be joined and the manner of attaching the ends of the hose to the coupling members.

Figure 2 is a view in vertical cross section taken in a plane represented by the line 2—2 of Figure 1.

Figure 3 is a fragmentary view in side elevation of the novel coupling and showing the expanding ring projecting through the opening and slot provided in the female member.

Figure 4 is a fragmentary enlarged view in vertical cross section through the sealing ring and the groove or recess in which it is mounted.

Referring more particularly to the disclosure in the drawing, the novel coupling comprises connecting members including a male part 1 and a female part 2 each provided on its interior with serrations 3 for connecting the ends of hose sections 4 shown in dotted outline. In order to retain the hose against the serrations, a ferrule 5 may be expanded against the interior of the hose to thereby lock the exterior surface against the serrations. The male part or member 1 is provided with a reduced annular flange 6 adapted to be telescopically received within an encompassing annular flange 7 on the female part. In order to lock these telescoping parts together, the flanges 6 and 7 are provided with complementary grooves or channels 8 and 9, respectively, in which seats a snap ring 10 having its free ends or projections 11 and 12 extending into an opening 13 and elongated slot 14, respectively. The depth of the channel 9 is such as to receive the snap ring 10 when it is disengaged from interlocking engagement with the relatively shallow channel 8. The opening 13 is approximately the size of the cross section of the end 11 while the elongated slot 14 permits arcuate movement or retraction of the end 12 to thereby expand the ring and disengage it from the relatively shallow channel 8 to permit the parts or coupling members 1 and 2 to be separated.

In order to seal these parts against leakage of the fluid being carried, the inner wall of the flange 7 is provided with a recess 15. This recess is substantially V-shaped and so tapered that its opposite side walls 16 and 17 are disposed at an angle of approximately 60°. Positioned within this recess is a substantially wedge-shaped resilient sealing ring or packing 18 having its vertex 19 engaging the base 20 of the recess 15. The vertex 19 is curved on an arc approximating but slightly less than the radius of curvature of the base 20 so as to permit the sealing ring or packing to pivot or shift and adjust itself within its recess. The sealing face 21 of the ring is also rounded and before the coupling members are assembled or when they are disassembled, extends or projects beyond the adjacent interior surfaces 22 of the flange 7 whereby when the parts 1 and 2 are in assembled relation, this face 21 contacts the external circumference of the flange 6 and the sealing ring is compressed to effect a leakproof, sealing engagement. In order to prevent the corners of the sealing ring from being extruded and pinched between the corners and adjoining surfaces of the telescoping flanges 7 and 6, these corners are rounded.

Excellent results have been secured by forming or molding the resilient sealing ring or packing of rubber or rubber-like material, such as one of the compounded synthetic rubbers.

From the above disclosure it will be readily seen that when the coupling members are assembled and the telescoping male and female parts are forced together, the snap ring 10 carried in the channel 9 will automatically lock these parts in assembled relation when the channels 8 and 9 are located in alignment as in Figure 1. In this position the sealing ring or packing 18 provides a most effective seal under all conditions of operation and pressures of the fluid being carried, and the connection by means of the snap ring permits the parts or coupling members to swivel without becoming disengaged.

Whenever it is desired to disassemble the parts, the insertion of any relatively sharp instrument such as a screw driver or a key provided for the purpose may be inserted between the shoulder 23 and the adjacent surface of the projecting end 12 of the snap ring, and by moving this end in a clockwise direction as viewed in Figure 3, the snap ring will release the parts to permit their ready disconnection.

Having thus disclosed the invention, I claim:

1. In a fire hose coupling, a pair of aligned coupling members of substantially the same outer diameter and provided with complementary telescoping parts, radially opening channels formed in the telescoping parts adapted to be moved into alignment when the parts are assembled, an opening and an elongated slot provided in spaced relation in the outer of the telescoping parts, means for connecting the members together and including a resilient, contractile snap ring carried by the outer part and adapted to interlock with the inner part, said ring having its free ends projecting radially outwardly with one of its ends projecting into and anchored within the opening and its other end projecting into the elongated slot, the end within the elongated slot being adapted to be engaged by a tool or other instrument to expand the ring and release the inner part therefrom for disassembly.

2. In a fire hose coupling, aligned coupling members of substantially the same external diameter and each adapted to receive and retain an end of a hose section and provided with telescoping ends, oppositely opening channels in the telescoping ends adapted to be placed in alignment when the ends are assembled, a contractile snap ring carried in the channel in the outer of the telescoping ends and adapted to seat in the channel of the other telescoping end and interlock these ends together, said snap ring having its free ends bent radially outwardly and projecting into spaced openings for ready access thereto to release the snap ring and disengage the ends, a recess in the outer of the telescoping ends opening inwardly, and a resilient sealed ring carried in the recess and adapted to seat and seal against the inner of said ends, said snap ring and sealing ring being so constructed and arranged as to permit relative rotation between the coupling members without affecting their interlocking or sealing engagement.

THOMAS R. SMITH.

---

CERTIFICATE OF CORRECTION.

Patent No. 2,389,825.                                       November 27, 1945.

THOMAS R. SMITH.

It is hereby certified that error appears in the printed specification of the above numbered patent requiring correction as follows: Page 2, second column, line 30, claim 2, for the word "sealed" read --sealing--; and that the said Letters Patent should be read with this correction therein that the same may conform to the record of the case in the Patent Office.

Signed and sealed this 5th day of February, A. D. 1946.

Leslie Frazer (Seal)                          First Assistant Commissioner of Patents.

is compressed to effect a leakproof, sealing engagement. In order to prevent the corners of the sealing ring from being extruded and pinched between the corners and adjoining surfaces of the telescoping flanges 7 and 6, these corners are rounded.

Excellent results have been secured by forming or molding the resilient sealing ring or packing of rubber or rubber-like material, such as one of the compounded synthetic rubbers.

From the above disclosure it will be readily seen that when the coupling members are assembled and the telescoping male and female parts are forced together, the snap ring 10 carried in the channel 9 will automatically lock these parts in assembled relation when the channels 8 and 9 are located in alignment as in Figure 1. In this position the sealing ring or packing 18 provides a most effective seal under all conditions of operation and pressures of the fluid being carried, and the connection by means of the snap ring permits the parts or coupling members to swivel without becoming disengaged.

Whenever it is desired to disassemble the parts, the insertion of any relatively sharp instrument such as a screw driver or a key provided for the purpose may be inserted between the shoulder 23 and the adjacent surface of the projecting end 12 of the snap ring, and by moving this end in a clockwise direction as viewed in Figure 3, the snap ring will release the parts to permit their ready disconnection.

Having thus disclosed the invention, I claim:

1. In a fire hose coupling, a pair of aligned coupling members of substantially the same outer diameter and provided with complementary telescoping parts, radially opening channels formed in the telescoping parts adapted to be moved into alignment when the parts are assembled, an opening and an elongated slot provided in spaced relation in the outer of the telescoping parts, means for connecting the members together and including a resilient, contractile snap ring carried by the outer part and adapted to interlock with the inner part, said ring having its free ends projecting radially outwardly with one of its ends projecting into and anchored within the opening and its other end projecting into the elongated slot, the end within the elongated slot being adapted to be engaged by a tool or other instrument to expand the ring and release the inner part therefrom for disassembly.

2. In a fire hose coupling, aligned coupling members of substantially the same external diameter and each adapted to receive and retain an end of a hose section and provided with telescoping ends, oppositely opening channels in the telescoping ends adapted to be placed in alignment when the ends are assembled, a contractile snap ring carried in the channel in the outer of the telescoping ends and adapted to seat in the channel of the other telescoping end and interlock these ends together, said snap ring having its free ends bent radially outwardly and projecting into spaced openings for ready access thereto to release the snap ring and disengage the ends, a recess in the outer of the telescoping ends opening inwardly, and a resilient sealed ring carried in the recess and adapted to seat and seal against the inner of said ends, said snap ring and sealing ring being so constructed and arranged as to permit relative rotation between the coupling members without affecting their interlocking or sealing engagement.

THOMAS R. SMITH.

CERTIFICATE OF CORRECTION.

Patent No. 2,389,825.  November 27, 1945.

THOMAS R. SMITH.

It is hereby certified that error appears in the printed specification of the above numbered patent requiring correction as follows: Page 2, second column, line 30, claim 2, for the word "sealed" read --sealing--; and that the said Letters Patent should be read with this correction therein that the same may conform to the record of the case in the Patent Office.

Signed and sealed this 5th day of February, A. D. 1946.

Leslie Frazer (Seal)  First Assistant Commissioner of Patents.